United States Patent [19]

Somers

[11] Patent Number: 5,097,371
[45] Date of Patent: Mar. 17, 1992

[54] THIN-FILM MAGNETIC HEAD

[75] Inventor: Gerardus H. J. Somers, Eindhoven, Netherlands

[73] Assignee: U.S. Philips Corporation, New York, N.Y.

[21] Appl. No.: 599,324

[22] Filed: Oct. 17, 1990

[30] Foreign Application Priority Data

Oct. 17, 1989 [NL] Netherlands ................ 8902569

[51] Int. Cl.⁵ .................... G11B 5/127; G11B 5/265
[52] U.S. Cl. ................................ 360/113; 360/121
[58] Field of Search ............... 360/113, 121, 125–126

[56] References Cited

U.S. PATENT DOCUMENTS 4,300,177  11/1981  Koel et al. .............. 360/113
4,907,113   3/1990  Mallary .................. 360/113

Primary Examiner—John H. Wolff
Attorney, Agent, or Firm—John C. Fox

[57] ABSTRACT

A thin-film magnetic head comprises a magnetic yoke having first and second flux conductors (3, 4) and a magneto-resistance element (7), located remotely from a head face (1). An edge portion (7a) of the magneto-resistance element (7) is located closer to the head face (1) than a second edge portion (7b). The first flux conductor (3) extends from the head face (1) to close to the first edge portion (7a) and the second flux conductor (4) extends from the head face at least to the second edge portion (7b). The magnetic head furthermore comprises a third flux conductor (5) which extends from the head face (1) to close to an end portion (16) of the first flux conductor (3) located near the first edge portion (7b). A transducing gap (17) and an inductive element (9) are located between the first and the third flux conductors (3, 5).

2 Claims, 2 Drawing Sheets

THIN-FILM MAGNETIC HEAD

BACKGROUND OF THE INVENTION

1. Field of the Invention

The invention relates to a thin-film magnetic head, provided with a head face for cooperation with an information carrier, the magnetic head comprising a magnetic yoke having a first and a second flux conductor and a magneto-resistance element which is remote from the head face and extends in a direction at least substantially perpendicular to the head face, which magneto-resistance element is closer to the head face via a first edge portion than via a second edge portion and the first flux conductor extending from the head face to at least approximately the first edge portion and the second flux conductor extending from the head face to at least the second edge portion and which magnetic head comprises a third flux conductor extending from the head face, a transducing gap and an inductive element being provided between this third flux conductor and the magnetic yoke.

2. Description of the Related Art

A thin-film magnetic head of the type referred to above is disclosed in the Japanese Patent Application 62-145527. Therein the transducing gap is located between the second and third flux conductor and the third flux conductor extends from the head face to beyond the magneto-resistance element. This known magnetic head consists of two parts, namely a read part having a magneto-resistance element and a write part having a write winding. Between the magneto-resistance elements and the write winding there is only one flux conductor which belongs to the magnetic circuit of both parts in order to keep the distance between the two transducing gap small and to provide a simple structure of the magnetic head.

The difficult parts of this prior art magnetic head is its manufacture. For the manufacture it is an advantage to deposit each part on a flat substrate. Namely, problems relating to an inconsistent layer thickness, whereby the layer can even be interrupted by large irregularities, occur in the deposition of a layer on an uneven substrate. In the prior art magnetic head a flat substrate for the deposition of the read part on the write part is achieved by accommodating in the write part the write winding in a recess provided on the third flux conductor. As a result thereof, the second flux conductor can be deposited on a flat substrate and the read part on the flat second flux conductor. This method deviates from the customary method of producing a write part. It is normal practice to deposit the write winding on a flux conductor and to deposit a further flux conductor thereacross, as is described in, for example, the Netherlands Patent Application 8901373. Depositing the write winding in a recess on a flux conductor requires more manufacturing steps, thereby complicating production and making it more expensive. Furthermore a disadvantage of the known magnetic head is that both parts influence each other magnetically, because the flux conductor overlap substantially completely. During writing magnetic leakage or stray flux can flow to the flux conductor of the read part via the magneto-resistance element. The premagnetisation of the magneto-resistance element may be influenced thereby so that the action of the element may get beyond the linear range.

SUMMARY OF THE INVENTION

An object of the invention is inter alia to adapt the magnetic head of the type defined in the opening paragraph, so that a magnetic head having improved magnetic properties and a structure which can be produced in a simpler manner, is obtained.

To that end, the magnetic head according to the invention, is characterized in that, the transducing gap is provided between the third and the first flux conductors, the third flux conductor extending to at least approximately an end portion of the first flux conductor located near the first edge portion and being magnetically coupled to the first flux conductor in the region of the end portion. By first depositing the magnetic yoke on the first flux conductor and then the inductive element, the inductive element can be deposited in accordance with the said conventional method. Moreover, because of the structure of the magnetic head less magnetic influence between the magneto-resistance element and the inductive part occurs during operation, as the flux conductors overlap to a lesser extent.

An embodiment of the magnetic head according to the invention, is characterized, in that the inductive element is contiguous to the head face. Consequently, the dimensions of the third flux conductor can be limited and the transducing gap can be formed in an advantageous manner.

BRIEF DESCRIPTION OF THE DRAWINGS

The invention will now be described in greater detail with reference to the embodiments of the magnetic head according to the invention shown in the accompanying Figures. Herein the FIGS. 1, 2, 3 and 4 are cross-sectional views of different embodiments of the magnetic head according to the invention.

DETAILED DESCRIPTION OF THE PREFERRED EMBODIMENTS

Figure 1:
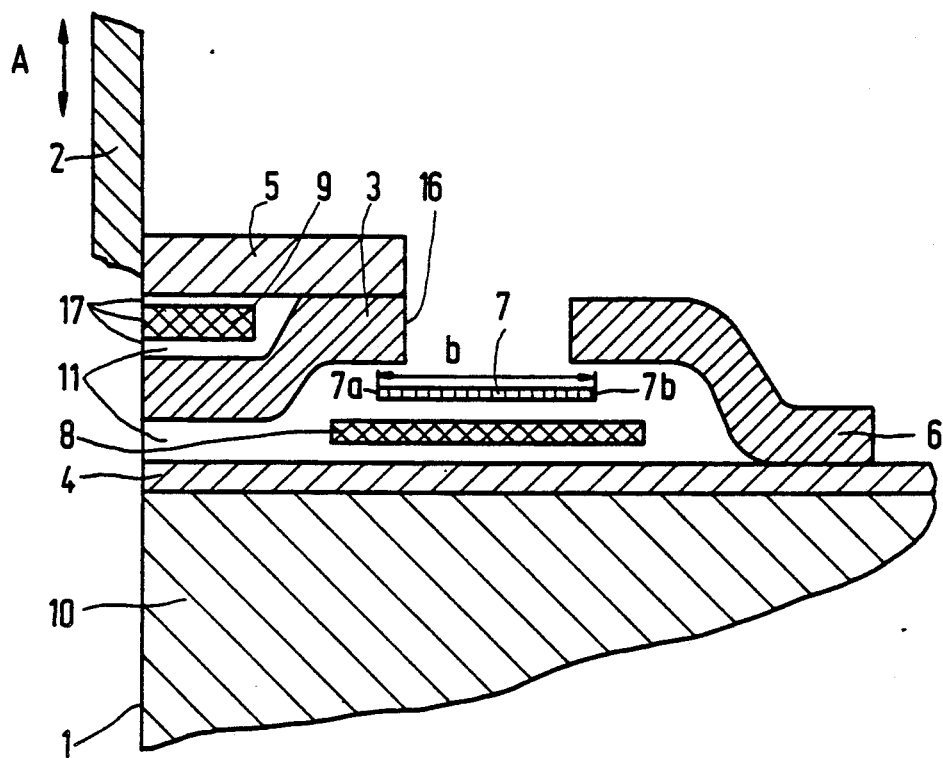

A first embodiment of the thin-film magnetic head according to the invention is shown in FIG. 1. The magnetic head is provided with a head face 1 for cooperation with an information carrier 2 which is movable with respect to the magnetic head in the directions of the double arrow A. A magnetic head is assembled from a read part and a write part. The read part comprises a magnetic yoke which is provided with a first, a second and an additional flux conductor 3, 4 and 6, a magneto-resistance element 7 and an electric conductor 8 used for premagnetising the magneto-resistance element 7 in known manner.

The write part includes the first and a third flux conductor 3 and 5, and a write winding 9 as the inductive element. The second flux conductor 4 is deposited on a substrate 10. Located on the second flux conductor 4 are the additional flux conductor 6, connected directly to the second flux conductor, and furthermore the electric conductor 8, the magneto-resistance element 7 and the first conductor 3, insulating layers 11 being present between these conductors and the element. The magneto-resistance element has a width b and extends in the lateral direction perpendicularly to the head face 1, to form a magnetic bridge between the first and the additional flux conductors 3, 6. The first and the second flux conductors 3, 4 extend from the head face 1 to approximately a first edge portion 7a to beyond a second edge portion 7b of the magneto-resistance element respectively, the first flux conductor 3 overlapping the magneto-resistance element 7 with an end portion 16 along a small distance. The write winding 9 and the third flux conductor 5 which extends from the head face 1 to the end portion 16 of the first flux conductor 3 and in that location is magnetically connected to the third flux conductor 3, are located on the first flux conductor 3. The write winding is separated from the flux conductors 3, 5 via insulating layers 11, which flux conductors 3, 5 form the magnetic circuit of the write part and between which a transducing gap 17 is located. During writing the magnetic flux flows through the first and the third flux conductor 3, 5 of the write part. Any leakage or stray fluxes cannot influence the magneto-resistance element 7, because the element 7 is remote from the first flux conductor 3.

Figure 2:
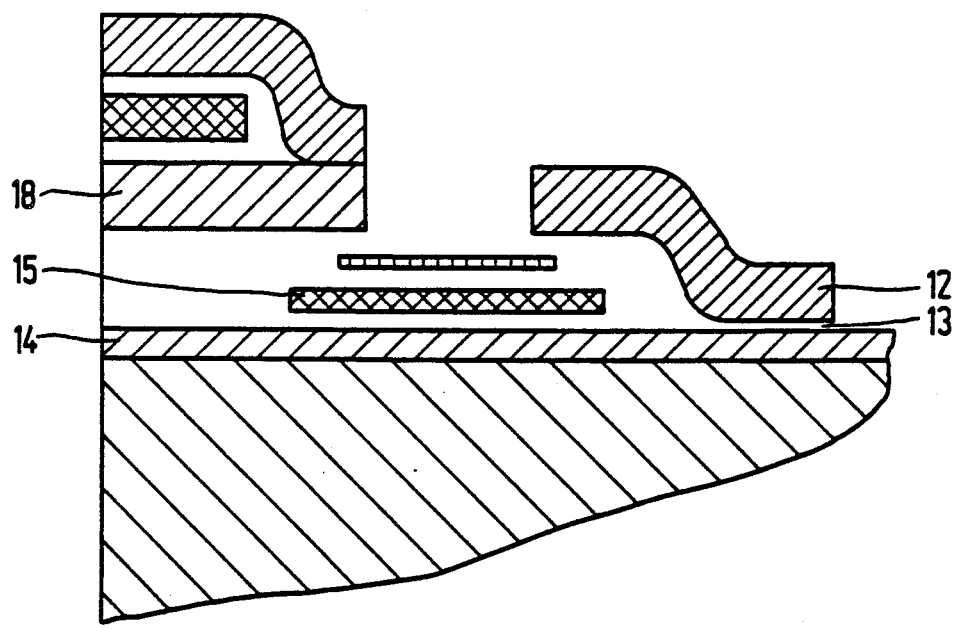

FIG. 2 shows a second embodiment of the magnetic head according to the invention. Therein, an additional flux conductor 12 is separated from a second flux conductor 14 by an insulating layer 13. This magnetic head can be produced in a simple manner, as, during manufacture, there is no need to make an aperture for the connection of the additional flux conductor 12 to the second flux conductor 14 in an insulating layer 13 present on the second flux conductor. The insulating layer 13 is arranged between the second flux conductor 14 and an electrical conductor 15 and may not be omitted when the second flux conductor 14 is electrically conducting. The first flux conductor 18 is here structured as a flat layer. This is done to obtain a larger reading gap, so that long-wave signals can be read more accurately.

Figure 3:
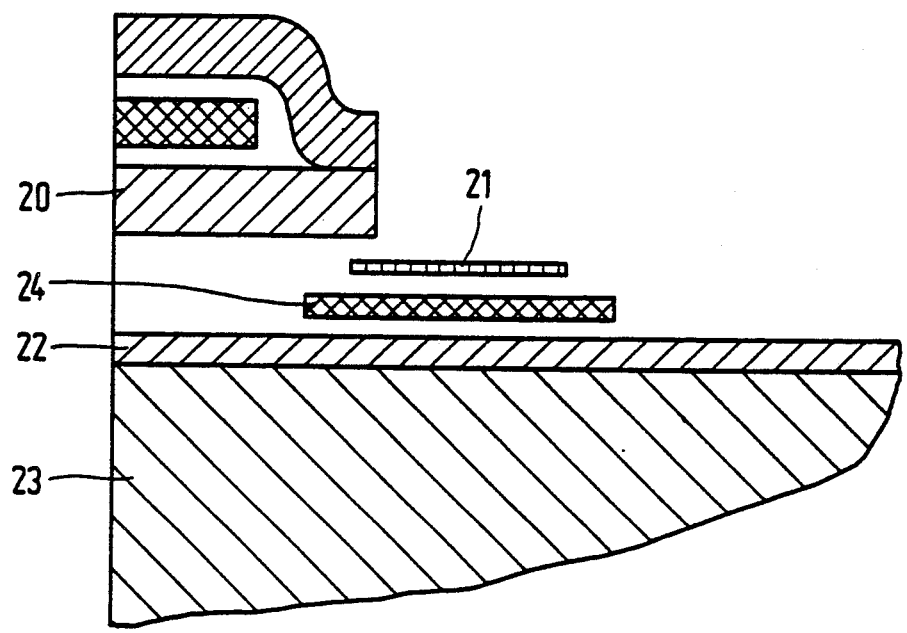

FIG. 3 shows a third embodiment of the magnetic head according to the invention. The magnetic circuit of the read part is herein formed by a first flux conductor 20, a magneto-resistance element 21 and a second flux conductor 22 present on a non-magnetic substrate 23. A further electrical conductor 24 is located between the magneto-resistance element 21 and the second flux conductor 22.

Figure 4:
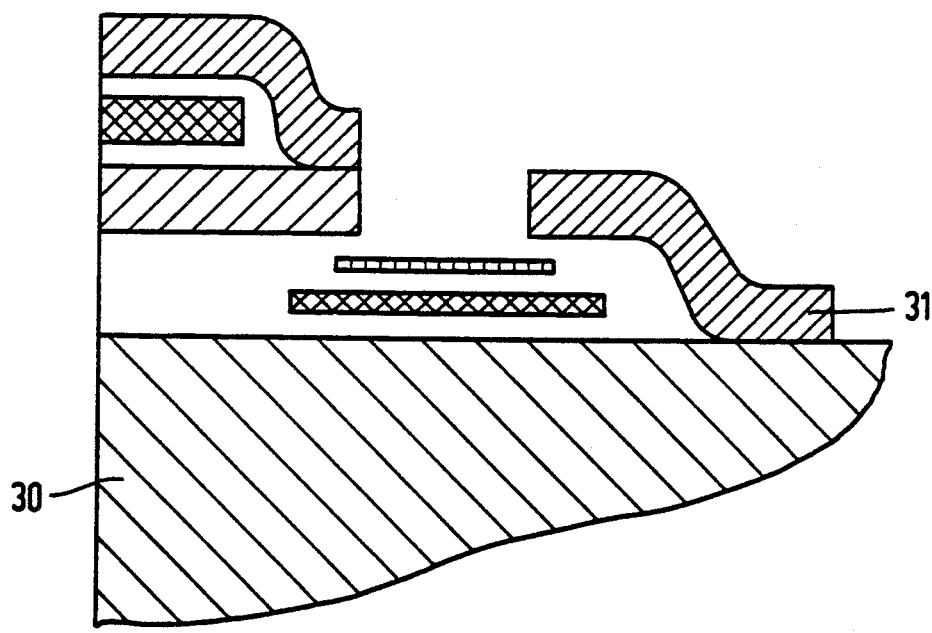

FIG. 4 shows a fourth embodiment of the magnetic head according to the invention. This magnetic head includes a magnetic substrate 30 so that it functions as a second flux conductor. An additional flux conductor 31 is deposited on the substrate 30 which, however, may alternatively be omitted, as mentioned in the foregoing.

It is also possible to omit the electrical conductor from the magnetic head structures described in the foregoing. Preferably a Barber pole will be provided on the magneto-resistance element to achieve a large linear range. A magneto-resistance element having a Barber pole is known from the U.S. Pat. No. 4,052,748. The write parts may alternatively be provided with a plurality of inductive elements. It is also possible to deposit the magneto-resistance element on those sides of the first and the additional flux conductor that are remote from the substrate, instead of between the substrate and the first and the additional flux conductor.

I claim:

1. A thin-film magnetic head, provided with a head face for cooperation with an information carrier, the magnetic head comprising a magnetic yoke having a first and a second flux conductor and a magneto-resistance element which is remote from the head face and extends in a direction at least substantially perpendicular to the head face, which magneto-resistance element is closer to the head face via a first edge portion than via a second edge portion and wherein the first flux conductor extends from the head face to approximately the first edge portion and the second flux conductor extends from the head face to at least the second edge portion and which magnetic head comprises a third flux conductor extending from the head face, a transducing gap and an inductive element being provided between this third flux conductor and the magnetic yoke, characterized in that the transducing gap is provided between the third and the first flux conductors, the third flux conductor extending to at least approximately an end portion of the first flux conductor located near the first edge portion and remote from the second edge portion and being coupled magnetically to the first flux conductor in the region of the end portion and the first, second and third flux conductors extending approximately in a direction parallel to that of said magneto-resistance element.

2. A thin-film magnetic head as claimed in claim 1, characterized in that the inductive element is contiguous to the head face.

* * * * *